United States Patent [19]

St. Clair

[11] 3,998,392
[45] Dec. 21, 1976

[54] EASILY MOVABLE IRRIGATION SPRINKLER SYSTEM

[76] Inventor: John Craig St. Clair, 1937 Summit St., Columbus, Ohio 43201

[22] Filed: Feb. 20, 1976

[21] Appl. No.: 659,785

[52] U.S. Cl. .............................. 239/547; 239/566; 239/567; 138/115
[51] Int. Cl.² ......................................... B05B 1/20
[58] Field of Search .......... 239/145, 450, 542, 547, 239/566, 567; 138/114–117; 61/12, 13

[56] References Cited
UNITED STATES PATENTS

| | | | |
|---|---|---|---|
| 3,567,134 | 3/1971 | Smith | 239/547 |
| 3,698,195 | 10/1972 | Chapin | 239/542 X |
| 3,903,929 | 9/1975 | Mock | 239/145 X |

*Primary Examiner*—Robert S. Ward, Jr.

[57] ABSTRACT

A sprinkler system weighing, when automatically drained, under 20 pounds per 1000 foot of tubing plus sprinkler heads and, that can be rapidly rolled up by a tractor carrying a reel, is made of two concentric polyester plastic tubes both 2 inches in diameter with 0.001 inch thick walls. The two concentric tubes are sealed together at the top and 0.04 inch diameter holes are spaced at 6 foot intervals along the top seal so that water flowing through the inner tube can spray out. The outer tube is aluminized to protect the polyester against the sun and a black stripe is painted along the top of the outer tube so that photoelectric cells can make the spray holes along the black line be unrolled on top when the irrigation tubing is put in place. When it is desired to move the irrigation tubing, the water is shut off and air is forced between the inner and outer tubes. This about completely forces the water out of the inner tube making an extremely light load to roll up and carry. The above sprinkler system is very advantageous in irrigating land like that between Columbus, Ohio and Omaha, Nebraska where pressures above 15 pounds per square inch gage are rarely necessary.

16 Claims, 4 Drawing Figures

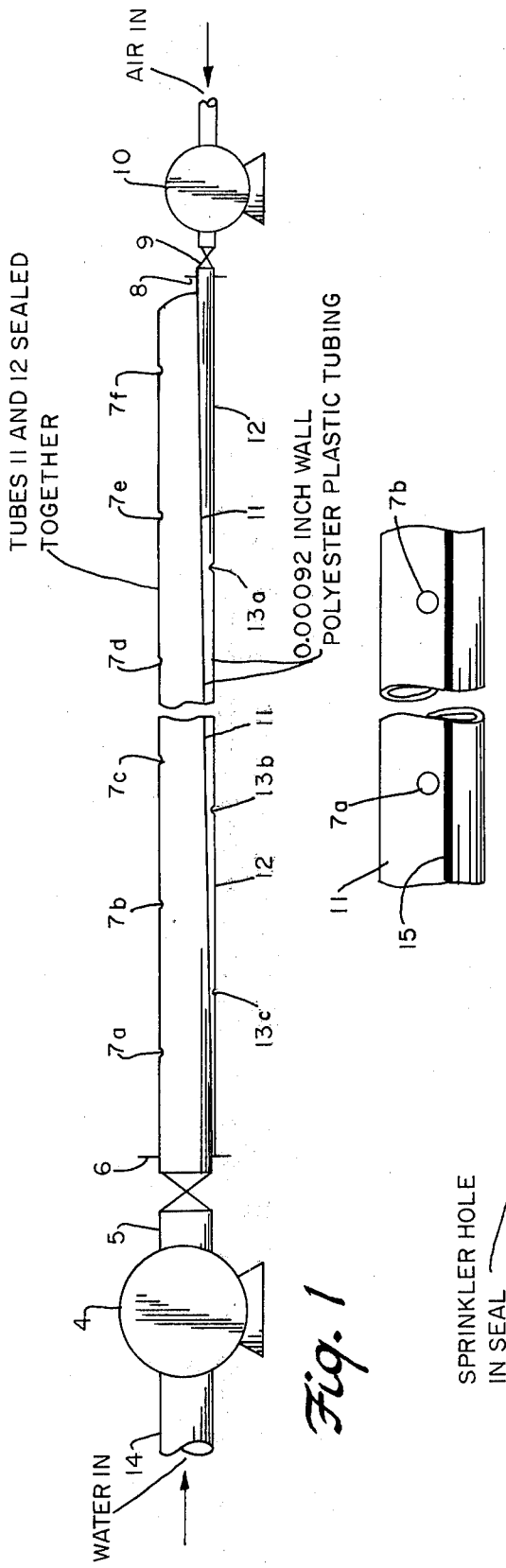
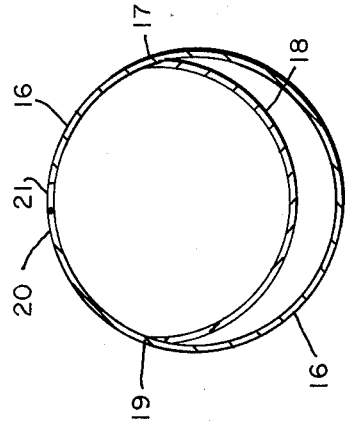
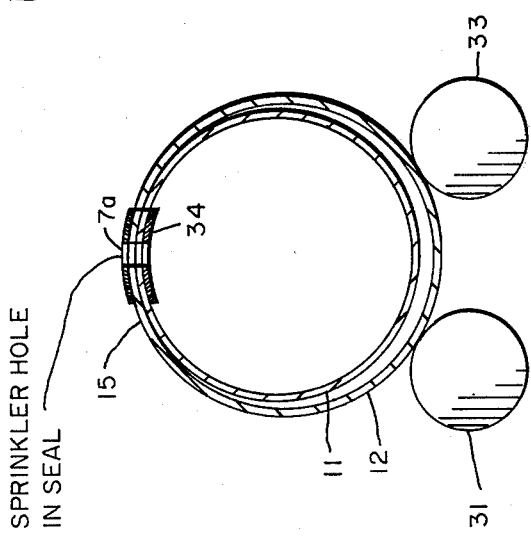

EASILY MOVABLE IRRIGATION SPRINKLER SYSTEM

The vast area of relatively level land known as the Corn Belt between roughly the center of Ohio and Eastern Nebraska is underlain by mud and gravel from which enormous amounts of water can be pumped. Corn and soybeans will yield on the average each year crops worth from $40 to $50 an acre more if this water underneath was pumped up and used to irrigate the corn and soybeans during July and August. During the rest of the year there will be enough rainfall to refill the wells. However this is rarely done since the cost of distributing or sprinkling the water over the crops costs too much. Many other, though smaller areas, exist in the United States where there is plenty of convenient water but irrigation is rarely profitable since the cost of the sprinkler system costs too much.

It is an object of this invention to provide a cheap sprinkler system that can be very easily moved. That is, the same sprinkler system can be moved from spot to spot over the land so that within a a week it can cover as many as 6 or more places in a field.

It is another object of this invention to provide a very light sprinkler system made of double walled flexible tubing with it being possible to blow air between the outer and inner tubes so that the water is forced out of the water carrying tube and as a result a drained tube is light enough that it can be rolled up and rolled out very rapidly on a reel that is moved by a tractor.

It is another object of this invention to make the tubing so light that as many as 4 or more parallel lines of the tubing spaced, for example, at 6 feet apart can be simultaneously rolled up or unrolled out with the result that simple holes of the order of 0.04 inches in diameter in the top of the tubes can be used for spray nozzles.

FIG. 1 of the drawing shows a lengthwise illustration of the invention.

FIG. 2 of the drawing shows a cross section of the form of the tubing used in FIG. 1.

FIG. 3 of the drawing shows a cross section of another form of the tubing.

FIG. 4 of the drawing shows a partial side view of the tubing where the marking stripe facilitating rolling up and rolling out the tubing by tractor so the holes of the tubing that the water sprays out of are in the correct position.

Referring to the drawing there is in FIG. 1 at 12 an outer tube of polyester plastic tubing and at 11 there is an inner tube of polyester plastic. The inner tube 11 and the outer tube 12 are sealed together at their top by a longitudinal seal. This can be seen more plainly in FIG. 2.

The inner tube 11 carries the water that it is desired to sprinkle over the land. The water is shown entering at 14 where it passes through pump 4, which raises the pressure to the desired level, then through valved pipe line 5 to union 6 and thence into the inner tube 11. Then the water sprays out of inner tube 11 through holes $7a$, $7b$, $7c$, $7d$, $7e$, and $7f$.

It is desirable, but not necessary, that the holes $7a$, $7b$, $7c$, $7d$, $7e$, and $7f$ all be on the top of the tube when the water is sprayed out of tube 11 and the land is being irrigated. This is done by having outer tube 11 marked with a longitudinal black stripe 15 along where the holes $7a$, $7b$, $7c$, $7d$, $7e$, and $7f$ are situated. Then by using photoelectric cells on a tube turning device on the tube layer this black stripe 15 is kept up in the unrolling operation. Or a man watching the tube unroll can see that the tube is unrolled with the black stripe up. If the tubes are of polyester and are used for any long period of time in sunlight, as they probably will be, the outer tube should all be covered with paint or more preferably the special aluminum coating put on by vapor deposition under vacuum that is commonly used to cheaply preserve polyester film for 5 years in continuous outdoor exposure.

It should be stressed that the holes $7a$, $7b$, $7c$, $7d$, $7e$ and $7f$ all pass through the seal between inner tube 11 and outer tube 12. That is the above holes are not supposed to allow water to pass from the inner tube 11 to between the inner tube 11 and the outer tube 12. However in the enormous number of holes that will be needed in the thousands of feet of tubing to irrigate a field of even the smallest size there is of course the possibility that some leakage of water will occur from the inner tube 11 to between the inner tube 11 and the outer tube 12. Therefore drainage holes for such leaked water are provided by holes $13a$, $13b$, and $13c$ in the outer tube 12. These holes $13a$, $13b$ and $13c$ also serve for another purpose which is to let out air which is mentioned below.

When it is desired to move the sprinkler tubing the water is cut off and valve 5 closed and union 6 unscrewed separating the tubing from valved pipe 5. Then valve 9 is opened and fan 10 is started and air is blown in, through valve 9 and union 8, between the inner tube 11 and the outer tube 12. This causes the inner tube 11 to collapse and the water is forced about completely out of inner tube 11. Then the fan 10 is stopped and valve 9 is closed. The air in the tube has been slowly leaking out of holes $13a$, $13b$, and $13c$ and now will continue leaking out. After the pressure has greatly reduced in the tube 11, as can be told by feeling the plastic tubing, the union 9 is unscrewed.

Now the tubing is ready to be rolled up. The tubing can be rolled up from either end with the air being forced out of the tubing as the rolling is carried out.

Many types of flexible tubing may be used. While polyester film cemented into tubing is preferred other types of tubing may be used, as for example polypropylene, polyethylene or polyvinyl chloride. While it is possible to use very thin metal tubing, plastic tubing such as above described is greatly preferred over metal tubing. It is stressed that plastic film is very cheap and very strong. For example polyester 0.001 inch thick film costs less than one cent per square foot and is made of material that has a tensile strength of about 25,000 pounds per square inch or in other words as strong as many grades of aluminum metal. This makes a 2 inch diameter two-walled sprinkler tube cost about 1 cent per lineal foot. An example of polyester film is that sold by Du Pont under the trade name of Mylar.

However in all cases the tubing is flexible enough to stand repeated flexing that is necessary for some desired irrigation of land. It is stressed that polyester tubing as described in the abstract costs under $20 an acre first cost to irrigate land as compared to about $200 an acre first cost to irrigate land for former sprinkler systems that are much more difficult to move. Obviously my tubing may be made of inferior materials and still my tubing will be superior to former sprinkler systems.

In this patent the phrase "flexible plastic" is defined as any flexible material made by combining together compounds containing carbon and hydrogen atoms.

The word "flexible" is defined as any material that can withstand the bending necessary with the bending and unbending needed to roll up and unroll the irrigation tubing in its use.

In FIG. 3 is shown a less preferred form of double walled tubing in which the double wall is only located part way around the tube. An outer tube is shown at 16 with a hole for the water to spray out of at 21. There is a black stripe at 20 for photoelectric cells to register on and thus direct the unwinding and winding operations so the spray hole 21 is vertical. Or it may be used for a man to watch and thus twist the tube so that the spray hole 21 is vertical.

The objection to the double walled tube shown in FIG. 3 is that since inner film 18 does not go all way around the outer tube 16, film 18 does not contribute to the strength when irrigation water is flowing through the tube 16. However in cases where film 18 is very thin, as it may be, its cost is only a small fraction of the total cost. As for example outer tube 16 may be made of 3 mil thick polyester and inner film 18 may be made of 0.5 mil polyester. Or the film used for making outer tube 16 may be made of two strips of different thicknesses joined together at the side with the heavier part of tube 16 resisting the internal stress in the tube where the film 18 does not help it resist the load.

My two-walled sprinkler tubing is surprizingly easy to fabricate out of plastic strips or other strips. For example it is common practice to sonically seal plastic strip into tubes. Such equipment is sold by the Ultra Sonic Seal Division of Kleer-Vu-Industries, Inc., Broomall, Pa. In this method of sealing the use of ultrasonic sound produces the heat necessary to seal together, or rather weld, plastic and metal films together so rapidly that the high strength of specially crystal oriented forms of such materials do not lose much of their high strength.

Ultrasonic sealing is preformed by cheap equipment that operates very fast and as a result it is only a slight item of expense in making tubing. However there is difficulty in reliably sealing thicknesses of more than 2 layers of film together in one operation. And, while film as thin as 0.5 mil has been ultrasonically sealed, polyester film is rated as a difficult to seal material and one should use films at least 1.5 mils thick to get reliable seals on polyester.

However in all cases seals may be made by flexible cements sold by Minnesota, Mining and Manufacturing Co. of Minneapolis, Minnesota. In making a complicated seal of many layers (as well as simple seals) it is preferred to first put on a solution of adhesive on the strips where the seal is finally desired. Then the solvent is allowed to evaporate and a nontacky but flexible layer of adhesive is deposited on the plastic film. I usually prefer to make the seal about ½ to ¾ inches wide and put on the adhesive in this width. Then the various films are assembled in position and an iron at a low heat (about 250° F depending on the particular adhesive used) is used to heat where the seal is desired to be made and the adhesive is present. On heating, the adhesive melts and on cooling a good flexible seal is formed that is stronger than the plastic film. There is no loss in strength in the plastic films sealed. The particular material sealed was polyester. Polypropylene and polyethylene require special treatment to give good seals by cements. The method of sealing polyester may also be done by polyester adhesives sold by the Du Pont Co. of Wilmington, Delaware. This method of sealing by cements costs some more than the ultrasonic method of sealing but the cost of sealing is still a small expense.

Forming and sealing strips into tubing is a conventional operation that has been done for many years. Strips of the material to be sealed into tubing are unrolled and under tension longitudinally are passed through forms that gradually shape the film into unsealed tubing with the edges together and overlapped. Then, if ultrasonic sealing is done, the lapped section of the film is passed between a metal piece called an anvil and a metal piece that may be called a hammer that by means of ultrasonic vibrations strikes extremely fast blows on the lapped portion of the plastic. This internally heats the lapped portion of the plastic and a strong seal is obtained. In fact even metal is sealed together ultrasonically. If adhesive sealing is done as previously described the lapped portion is just passed between hot irons. Or the whole tube is heated in a tunnel and the seal is made by just the pressure of rollers.

The desired holes for water to spray out of are preferably bored out by a high speed drill when the inner tube is expanded by air rather than water. Pricking with an awl has not been found to give precise sized holes. The sides of pricked in holes tend to spring back in place varying amounts.

The size and spacing of the holes preferred along the tube will vary according to the crop and the rate the land will absorb water. The size of the holes needed can be calculated from the flow through orifices in any text book on hydraulics. The rate of water absorption of a particular soil can roughly be predicted by bulletins on irrigation for the state put out by state agencies but is best determined by actual test. For example when it is desired to irrigate an orchard at 0.75 inches of water per hour with a 10 foot pressure head of water one would use 0.06 inch diameter holes spaced every 6 feet on tubing spaced 6 feet apart. When one desires to irrigate corn on usual land in the Corn Belt one would use a rate of 0.4 inches an hour with the same pressure head of 10 feet and 0.04 inch diameter holes spaced 6 feet apart on tubing spaced 6 feet apart.

It is important that the irrigation water be free of material that may plug the holes. This is done by first settling out the mud if the water used is surface water from a stream. And this is followed in all cases by passing the water through a coarse filter before the water is passed through the irrigation tubing disclosed when there is a possibility of particles plugging the holes in the tubing. However soaking the tubing in hydrofluoric acid is practical for plastic tubing and this will dissolve sand and most of the mud particles that have clogged the holes in the tubing.

Repairs to the tubing has been found to be easier than first thought. Repairing a hole in the outer tube 12 in FIG. 2 or outer tube 16 in FIG. 3 is done by wiping off the water from the deflated tube and wrapping some electrician's tape around the tube. Splicing two lengths of double walled tubing together can be done by cutting back the outer tubing, where it is double walled, an inch from the seal and placing the two ends of inner tubing over a tube of rock salt. Then the inner tubing ends are sealed together. Then the inner seal is covered with thin walled film and the film sealed to the outer tube with electrician's tape. Then the rock salt is dissolved out with water.

However water is frequently so cheap, in great areas of the U.S. like I have mentioned the Corn Belt to be, that large leaks can usually be tolerated in the tubing. And the tubing is so cheap that it can be thrown away if it leaks. I have figured that if polyester tubing just lasts being rolled and unrolled 18 times it will very easily pay for itself. And polyester film is noted for its ability to stand repeated folding and rough handling. Polyester film stands 14,000 cycles of folding at 25° C by the ASTM D2176-63T test.

It may be thought that the strength of the walls of the 0.00092 inch thick polyester plastic that I have used may be too weak to withstand the internal pressures needed for irrigation. This has been found to be wrong. Since the tubing is so cheap there does not need to be nozzles operating under high pressures to spray long distances from widely spaced pipes. My sprays only have to travel several feet, though it is practical for the sprays to operate under sufficient pressure to travel 25 feet. Also there should not be large differences in elevation along a tube so that high pressures are required to force the water to higher locations. The tubing will be unrolled and rolled up by tall wheeled, but very light and small tractors in and parallel to the rows of corn and soybeans. It is highly desirable that such rows be placed along a hill side and not up and down a hill side to prevent the normal erosion of the land from rains. Therefore the difference of elevation along a single length of tubing will be small. Also in this vast area called the Corn Belt we have very few hills anyway. And of course thicker films of plastic can be used for the tubing which will allow much higher internal pressures in the tubing than I have allowed for above. While thicker films will cost more these thicker films will still only cost a fraction of the cost of prior sprinkler systems.

EXAMPLES

Individual lengths of double walled tubing like FIG. 2 were made that were individually 10 inches long, then 8 feet long and finally 39 feet long. The tubing was made out of polyester tubing obtained from the Du Pont Company and was their Type A film that was 0.00092 inches thick and sold under the trade name of Mylar. Adhesive tape with adhesive on both sides that was purchased from Sears Roebuck was used to join together the sides of the plastic strip and form tubes. It was found that two concentric tubes each joined together by a ⅜ inch wide adhesive could easily stand a pull between the sides of 22 pounds per lineal inch which was the limit of available scales. In fact a strong man could not break a 1 inch wide section or ring of the double walled tubing with his hands.

The three pieces of double walled tubing all drained to surprizingly the same values by the method of the invention. That is they drained to a final weight of between 15 to 18 pounds per 1000 feet of tubing that was slightly less than 2 inches in diameter. The only exception was the 8 foot section of tubing after I unintentionally got the connections reversed and forced the space between the inner tube 11 and the outer tube 12 full of water. As mentioned previously I then blew the inner tube 11 full of air. The final drained weight of the 8 foot tube was then 25 pounds per 1000 feet of tubing. The air pressure available for forcing the water out was in all cases equal to a pressure of 9 inches of water. Times of drainage used were under 15 minutes. With the much higher air pressures that will be available for commercial models of the apparatus, lengths of tubing over 1000 to 2000 feet long will drain in less than an hour. (Note. The above experiments and the one that follows were carried out without the air containing tubes 31 and 33, that are later referred to, attached to the irrigation sprinkler as shown in FIG. 2. These together will add about two pounds per thousand feet of sprinkler, being preferably made out of roughly 1 mil thick polyester film sonically sealed into 1 inch diameter tubes.)

When the above experiments were repeated with two mil thick polyester film of the same type from the above same manufacturer in the same diameter of tubing, the weights of the double tube of the various lengths were more than the 21 to 24 pounds per thousand feet if one had predicted the weight by just adding on the extra weight of the additional thickness of plastic film. However even if the weights obtained were not consistent as in the previous experiments the weight was definitely under 50 pounds per 1000 feet. This indicates that if the very lowest weight per foot is to be obtained with a given weight of plastic film that the plastic film 11 of the inner tube should be very thin, or at least under one mil thickness if polyester, so it will be flexible enough to squeeze out the water in the tube formed by film 11. The rest of the weight of plastic film used is then concentrated in film 11. (Plus a little in tubes 31 and 33. As noted later these tubes 31 and 33 were added after I ran the preceding experiments.)

In actual operation of the irrigation tubing, which was done after the preceding about all was written, it was really found that sediment free water had to be used for irrigation if trouble was to be avoided with very small holes, punched or drilled in plastic film, acting as spray nozzles. This is due to larger particles plugging the holes and smaller particles eroding and enlarging the holes.

However it was found that the number of holes needed could be greatly reduced by first rotating the irrigation system as shown in FIG. 2 from side to side by adding air tubes 31 and 33. The air pressure would be increased in tube 31 say and a vacuum drawn in tube 33 which would rotate the tubes 11 and 12 clockwise. Then the air pressure would be increased in tube 33 and a vacuum drawn in tube 31 and the tubes 11 and 12 would rotate counter clockwise. In this way you could afford to put in corrosion and erosion resisting metal eyelets each with a 0.1 inch diameter hole that would pass particles nearly 0.1 inch in diameter. With a 10 feet head of water you could irrigate a 30 feet wide strip about a good 5 feet long with a curved eyelet. In every 50 minutes you put on the water equivalent to a half inch rain. Then you would squeeze out the water from tube 11 and slide the tube along 5 feet by pulling on the end of the tube. With 20 eyelets on a 600 foot long sprinkler tube like FIG. 2 you would irrigate nearly a half acre every 8 hours with each tube. Of course if desired you could put other air tubes like air tubes 31 and 33 on the sprinkler system shown in FIG. 2 and make the eyelet 34 not only go back and forth swinging its spray in a path perpendicular to tubes 11 and 12 but also swing in a path parallel to tubes 11 and 12. This latter would greatly reduce the frequency needed for sliding the sprinkler system by pulling an its end.

I claim:

1. A multiple walled tube for spreading irrigation water which comprises: two flexible tubes with an inner tube inside an outer tube, means to introduce water for irrigation periodically into the inner tube, means to introduce air between the inner tube and the outer tube at other periods to force water out of the inner tube so that the combined tubes may be conveniently made lighter and moved from place to place, a seal between the inner and outer tubes, and a plurality of holes through the seal so that water in the inner tube will flow to outside the tubes and form a spray that will irrigate land.

2. An apparatus according to claim 1 in which the outer tube is marked by a color so that the multiple walled tube may be unrolled with the spray holes upright.

3. An apparatus according to claim 1 in which the outer tube has spaced holes through its wall to permit the more rapid removal of air from between the outer and inner tubes.

4. An apparatus according to claim 2 in which the outer tube has spaced holes through its wall to permit the more rapid removal of air from between the outer and inner tubes.

5. An apparatus according to claim 4 in which the inner tube is of nearly the same diameter as the outer tube so that when the inner tube is under pressure from water inside the inner tube it can expand against the outer tube with the outer tube helping to resist the pressure of water against the inner tube.

6. An apparatus according to claim 2 in which the two tubes are made of plastic.

7. An apparatus according to claim 3 in which the two tubes are made of plastic.

8. An apparatus according to claim 4 in which the two tubes are made of plastic.

9. An apparatus according to claim 5 in which the two tubes are made of plastic.

10. An apparatus according to claim 6 in which the two tubes are made of polyester plastic.

11. An apparatus according to claim 7 in which the two tubes are made of polyester plastic.

12. An apparatus according to claim 8 in which the two tubes are made of polyester plastic.

13. An apparatus according to claim 9 in which the two tubes are made of polyester plastic.

14. A multiple walled tube for carrying irrigation water which comprises: a flexible tube with a double wall at least half way around the tube, means to introduce air between the outer wall and the inner wall of the double walled portion of the tube so that the inner wall of the double walled part of the tube flexes inward and drives water out of the tube when desired, holes in the tube in the single walled section of the tube that do not penetrate between the inner and outer walls of the double walled portion of the tube, and means to introduce water into the tube when desired so that it is sprayed out the holes in the single walled portion of the tube.

15. An apparatus according to claim 14 in which the tube is made of plastic.

16. An apparatus according to claim 15 in which the plastic is polyester plastic.

* * * * *